United States Patent Office.

RICHARD LAUCH AND CARL KREKELER, OF ELBERFELD, GERMANY, ASSIGNORS TO THE FARBENFABRIKEN, VORMALS FR. BAYER & CO., OF SAME PLACE.

BLUE-GREEN AZO DYE.

SPECIFICATION forming part of Letters Patent No. 464,775, dated December 8, 1891.

Application filed July 17, 1891. Serial No. 399,846. (Specimens.)

*To all whom it may concern:*

Be it known that we, RICHARD LAUCH and CARL KREKELER, chemists, (assignors to the FARBENFABRIKEN, VORMALS FR. BAYER & Co., at Elberfeld,) subjects of the King of Prussia, residing at Elberfeld, Germany, have invented a new and useful Improvement in the Manufacture of Dye-Stuffs, of which we give in the following a clear and exact description.

Our invention relates to the production of a new bluish-green coloring-matter for dyeing wool, of the formula

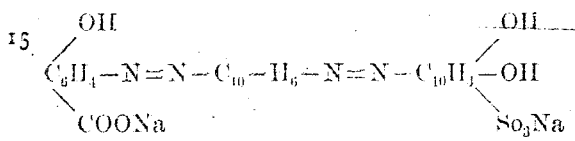

by combining one molecular proportion of the diazo compound of amidonaphthaline azosalicylic acid with one molecular proportion of dihydroxynaphthaline monosulpho acid we described in Letters Patent No. 444,679, dated January 13, 1891.

We proceed as follows: 15.3 kilos, by weight, of amidosalicylic acid are dissolved in water, and, after having been cooled by ice, mixed with a watery solution of seven kilos, by weight, of sodium nitrite. On the addition of muriatic acid the diazo compound is precipitated as a fine crystalline powder, and after about half an hour the diazo compound has completely separated. The latter is thereupon filtered off and, without having been dried, under continuous stirring mixed with a hydrochloric-acid solution of 14.3 parts, by weight, of alpha-naphthylamine. On the addition of sodium acetate the production of a dye-stuff immediately begins, and is finished when the liquid, after standing for about twelve hours, is heated for a short time to about 50° centigrade. The thus-formed amidoazo compound is filtered off in order to remove the uncombined alpha-naphthylamine, then dissolved in diluted alkali, and this solution, after the addition of seven kilos, by weight, of sodium nitrite, is acidulated with diluted hydrochloric acid under continuous stirring. After about one hour a diazo product has completely separated as a black precipitate. It is thereupon added to an acetic-acid solution of about 26.2 kilos, by weight, of dihydroxynaphthaline monosulpho acid of the Letters Patent No. 444,679, dated January 13, 1891, in the presence of an excess of sodium acetate. The production of the dye-stuff is easily to be completed by heating for a short time at about 50° centigrade. The thus-formed coloring-matter, of the formula

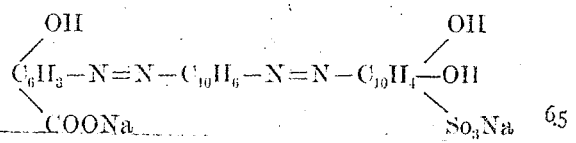

represents, after having been neutralized with alkalis, filtered off, and dried, a bluish-black powder, which with difficulty dissolves in cold water, more easily in hot water with blue-violet color, likewise in solutions of sodium carbonate with blue violet, in solutions of sodium hydroxide and ammonia with almost pure blue color. In concentrated sulphuric acid it is soluble with deep-green color, that is altered by addition of water into a pure blue, the whole dye-stuff gradually separating in dark-blue flakes. In the same form the dye-stuff is also precipitated when its water solutions are mixed with mineral acids in excess.

The above-described coloring-matter dyes wool mordanted with chromium salts in bluish-green shades very fast against sunlight, soap, and milling.

Having thus described our invention and in what manner it may be carried out, what we claim as new, and desire to secure by Letters Patent, is—

1. The new azo coloring-matter, of the formula

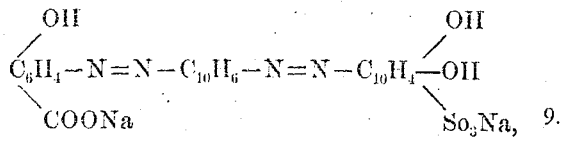

which is in a dry state a bluish-black powder, dissolving with difficulty in cold water, more easily in hot water with blue-violet color, also readily in solutions of alkaline with almost pure blue color; it is soluble in concentrated sulphuric acid with dark-green color, that is altered by addition of water into a pure blue, while the whole dye-stuff gradually separates in dark-blue flakes; it is capable of dyeing wool mordanted with chromium salts in bluish-green shades very fast against sunlight, soap, and milling.

2. The process for producing the new dye-stuff, as hereinbefore described, which consists in combining one molecular proportion of the diazo compound of amidonaphthaline azo-salicylic acid with one molecular proportion of dihydroxynaphthaline monosulphonic acid in the presence of sodium acetate.

In testimony whereof we have signed our names to this specification in the presence of two witnesses.

RICHARD LAUCH.
CARL KREKELER.

Witnesses:
WM. ESSEMOLIN,
RUDOLPH FRICKEL.